Oct. 21, 1952  E. E. BARKSTROM  2,614,463
GROOVING MACHINE
Filed March 23, 1950  5 Sheets-Sheet 1

FIG. 1

INVENTOR
E. E. BARKSTROM
BY E.F. Kane
ATTY.

Oct. 21, 1952  E. E. BARKSTROM  2,614,463
GROOVING MACHINE
Filed March 23, 1950  5 Sheets-Sheet 2

FIG. 2

INVENTOR
E. E. BARKSTROM
BY E. A. Kane ATTY.

Oct. 21, 1952 E. E. BARKSTROM 2,614,463
GROOVING MACHINE
Filed March 23, 1950 5 Sheets-Sheet 4

INVENTOR
E. E. BARKSTROM
BY *E. F. Kane* ATTY.

Oct. 21, 1952 — E. E. BARKSTROM — 2,614,463
GROOVING MACHINE
Filed March 23, 1950 — 5 Sheets-Sheet 5

INVENTOR
E. E. BARKSTROM
BY E. F. Kane ATTY.

Patented Oct. 21, 1952

2,614,463

UNITED STATES PATENT OFFICE 2,614,463

GROOVING MACHINE

Elmer E. Barkstrom, Chicago, Ill., assignor to Western Electric Company, Incorporated, New York, N. Y., a corporation of New York Application March 23, 1950, Serial No. 151,473

9 Claims. (Cl. 90—13)

This invention relates to a machine for cutting grooves in articles and more particularly to a machine for simultaneously removing the mold flash on opposite sides of a molded telephone handset handle and cutting grooves in the handle along the lines of the flash.

An object of the present invention is to provide a simple machine for expeditiously cutting a groove along a predetermined irregular line.

Another object of the invention is to provide a simple machine for effectively and efficiently removing the flash and cutting a groove along the line of flash in molded telephone handset handles.

In accordance with one embodiment of the invention, a carriage having a holder for supporting an article thereon is moved through a straight path to guide the articles between a pair of rotatable cutters supported on pivoted arms which are actuated by cams on the carriage for moving the cutters horizontally transversely of the movement of the carriage and actuated by other cam means for vertical movement in timed relation to the movement of the carriage to cause the cutters to follow successive portions of the irregular mold flash and cut grooves in the article on the center line of the flash. The cutters are also cam actuated for oscillatable movement about vertical axes in timed relation to the movement of the carriage to position the cutters substantially perpendicular to the surface of the portion of the article being cut.

Other objects and advantages of the invention will become apparent by reference to the following detailed description and the accompanying drawings illustrating a preferred embodiment thereon in which.

Figures 9, 10, 11:
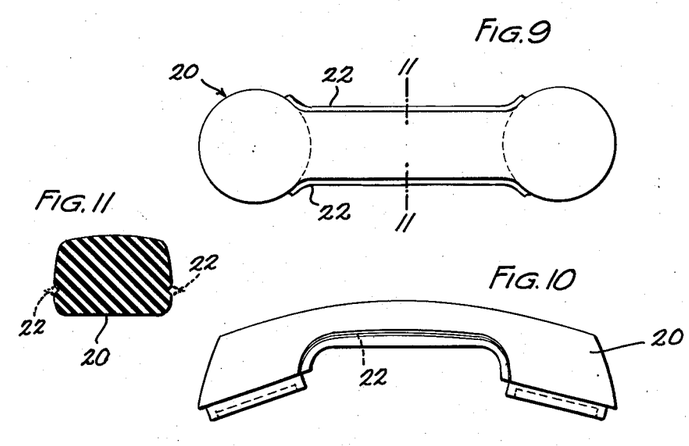
Figs. 9 and 10 are plan and side elevational views, respectively, of a telephone handset handle
Fig. 11 is a cross-sectional view of the handle taken on the line 11—11 of Fig. 9.

Articles molded from plastic material in an injection molding apparatus usually have mold flashes or fins formed at the line of juncture of the component parts of the molding dies. In the molded telephone handset handle 20 shown in Figs. 9 to 11, a pair of fins or mold flashes 22 are formed on opposite sides of the handle and extend through irregular curved paths, longitudinally, vertically and laterally, relative to the handle. In order to give the molded handle a finished appearance, the flash is removed and a groove of uniform depth and width is cut in the handle along the base of each of the lines of flash.

Figure 7:
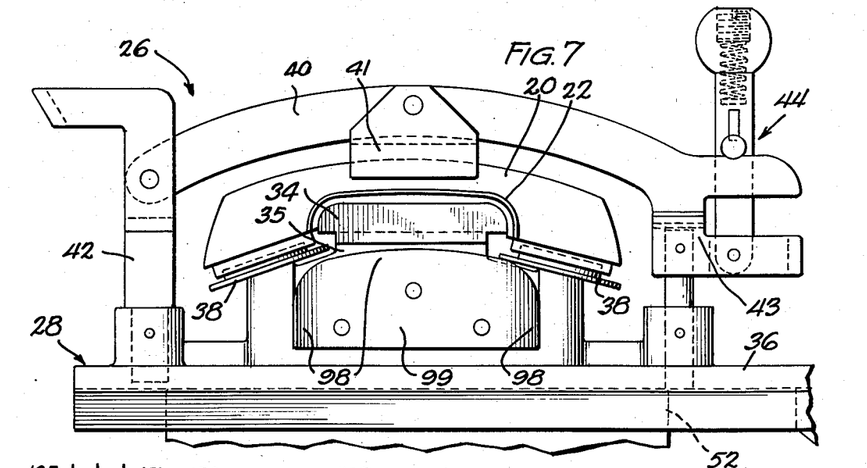
Fig. 7 is a side elevational view of a portion of the machine showing the article holder with the article clamped in position therein.

The present machine 25 (Fig. 1) for simultaneously removing the pair of fins 22 from the article 20 is provided with a holder 26 for supporting the article 20 on a carriage or movable slide 28 operable to move the handle between a pair of conical shaped end milling cutters 30—30 (Fig. 2) mounted on power actuated spindles 32 on opposite sides of the holder 26. The holder comprises a seat or supporting member 34 (Figs. 2 and 7) having surfaces adapted to engage the inner lower surface of the article 20 as indicated in Fig. 7, and being secured to the upper portion of a wall 35 extending upwardly from a horizontal base portion 36 of the carriage 28. Cylindrical members 38—38 secured to the vertical wall 35 are adapted to engage in the recesses in the end portions of the article 20 to position the article in the holder 26. The article 20 is securely clamped in the holder during the groove cutting operation by clamping means comprising a lever 40 having a pad 41 engageable with the article. The lever 40 is pivotally connected at one end to a post 42 on the carriage 28 and has its other end releasably secured in clamping position against a stop member 43 by a latching mechanism generally indicated 44 pivotally mounted on the member 43.

The carriage 28 is mounted for rectilinear movement and is provided with a dove-tailed slot 50 (Fig. 2) for receiving a dove-tailed rail or guide 52 extending upwardly from a housing member 54. The housing member 54 is attached to a table top or plate 56 which is secured to the top of a plurality of vertically extending plates or frame members 58—58 and cooperates therewith to form a framework for the apparatus. At one end thereof, the carriage 28 is connected through a lug 60 and a link 61 to an arm 62 (Fig. 1), which is secured to one end of an actuating or slide rod 63. The rod 63 is slidable in bearing blocks 64—65 secured to the plate 56, and has secured to its opposite end an arm 66 from which extends a rod 67 slidable in an aperture in the bearing block 64 for preventing the rotation of the rod 63. A cam follower 70 mounted on the rod 63 rides in a cam groove 72 of a barrel cam 74 secured to a cam shaft 75. The cam shaft 75 is journalled for oscillatable movement in bearing brackets 76—76 secured to the rear frame plate 58 and has a sprocket 77 secured to one end thereof, which sprocket is connected through a chain 78 and sprocket 79 to a reversible motor 80 which is also supported on the frame plate 58. The reversible motor 80 under control of a control circuit later to be described, serves to oscillate the cam shaft 75 and the cam 74 through approximately 330° and the cam groove 72 is shaped to cause the reciprocation of the rod 63 and the carriage 28 to move the article 20 in a straight line through a distance sufficient to move successive portions of the fins 22 throughout their length into engagement with the cutters 30.

Figure 5:
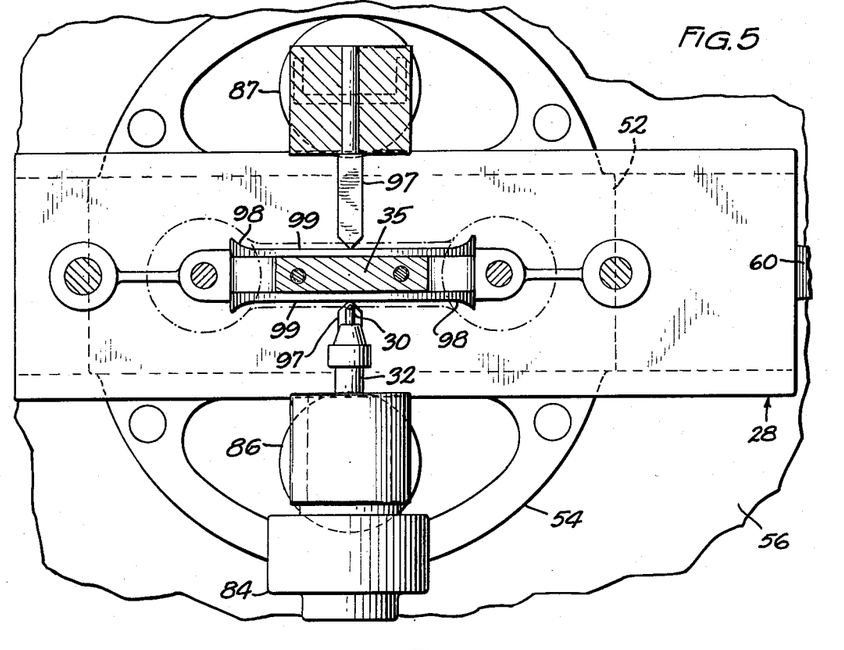
Fig. 5 is a fragmentary plan elevational sectional view of a portion of the machine indicated by the line 5—5 of Fig. 2.
Figure 6:
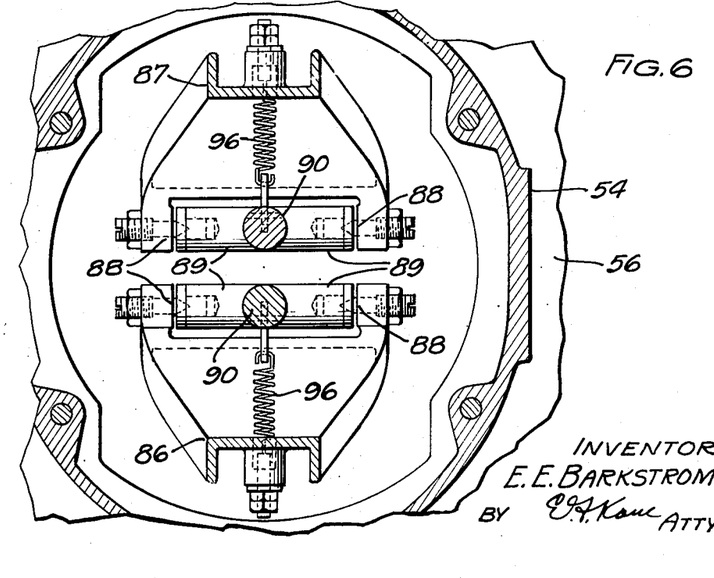
Fig. 6 is a fragmentary plan sectional view taken on the line 6—6 of Fig. 2.

The cutter supporting spindles 32 are driven by suitable motors 84—84 here shown as air motors each of which is secured in the apertured upper end of a movable bracket or supporting arm 86—87. The arms 86—87 (Fig. 6) are bifurcated at their lower ends, and are pivotally connected at 88 to cross-arms 89—89 formed on a pair of vertically disposed supporting elements or rods 90—90 which are supported with their axes in substantially vertical alignment with the ends of the cutters 30. The rods 90 are mounted for oscillation about their axes and for movement vertically in bearing apertures 91 (Fig. 2) formed in the dove-tailed portion 52 of the housing 54 and a bracket 93 secured to the frame plate 58. The supporting arms 86 and 87 are of different lengths and the bifurcated ends thereof are connected to the rods 90 at different elevations to provide clearance vertically to allow for the oscillation of the arms 86—87 and the cutters 30 about the axes of the elements 90. As thus supported, the cutters 30 are capable of being oscillated about the vertical axes of the elements 90, are capable of being arcuately moved in a substantially horizontal direction in vertical planes passing through the axes of the elements 90 and are capable of being raised and lowered. Helical springs 96—96, connected at one end to the arms 86—87 and at the other end to the elements 90, serve to urge the cutters into engagement with the article 20. Cam followers 97—97, secured to the upper portion of the brackets 86, have their reduced end portions riding on cam surfaces 98 of cam plates 99—99 secured to opposite sides of the vertical wall 35 of the carriage 28. The cam surfaces 98 on the cam plates 99 (Fig. 5) are shaped to rock the brackets 86 about their pivots 88 and effect the movement of cutters 30 toward and away from the article 20 in a substantially horizontal direction transversely of the direction of movement of the carriage and the article to cause the cutters to follow the successive portions of the fins 22.

Figure 2:
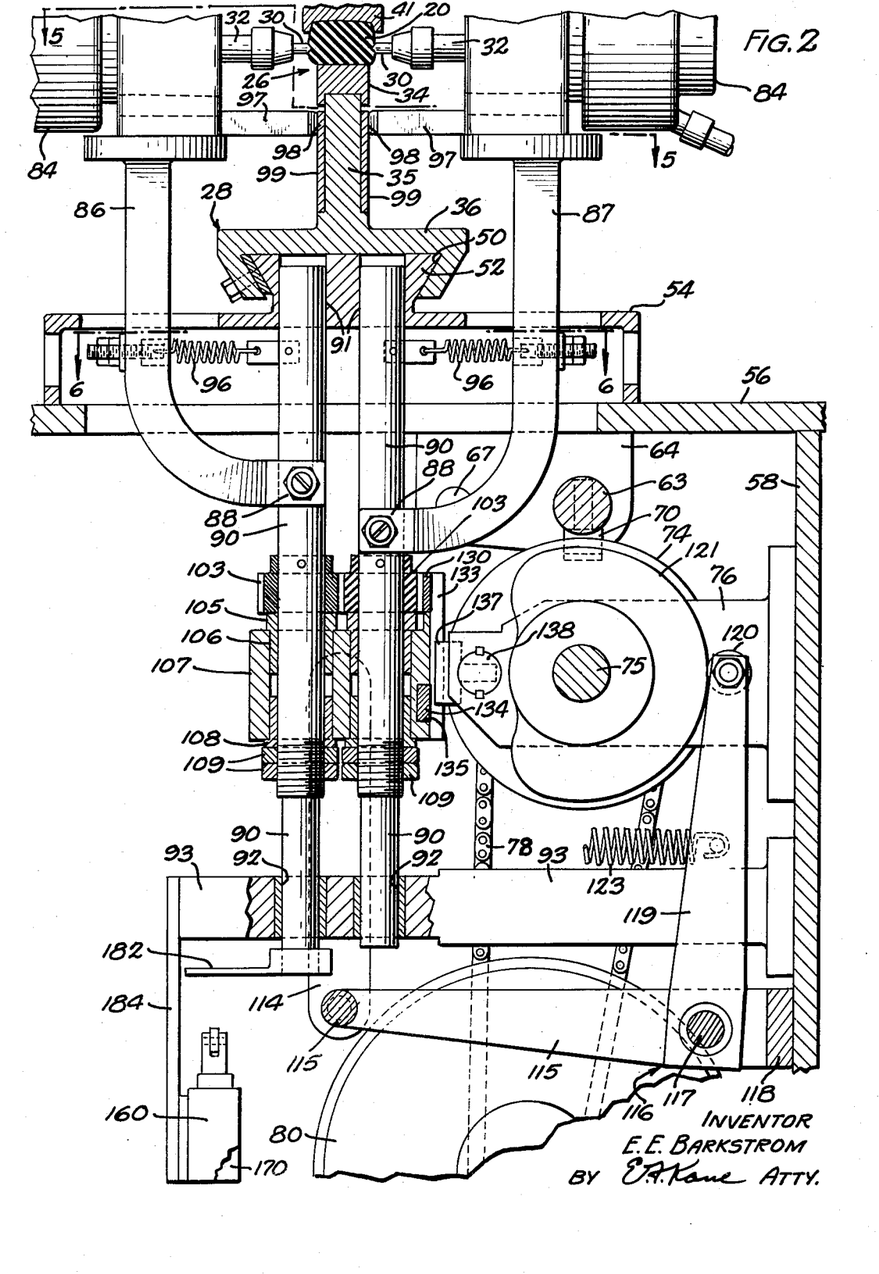
Fig. 2 is a vertical transverse sectional view taken substantially along line 2—2 of Fig. 1 and showing the machine with the parts thereof in an intermediate position.
Figures 3, 4:
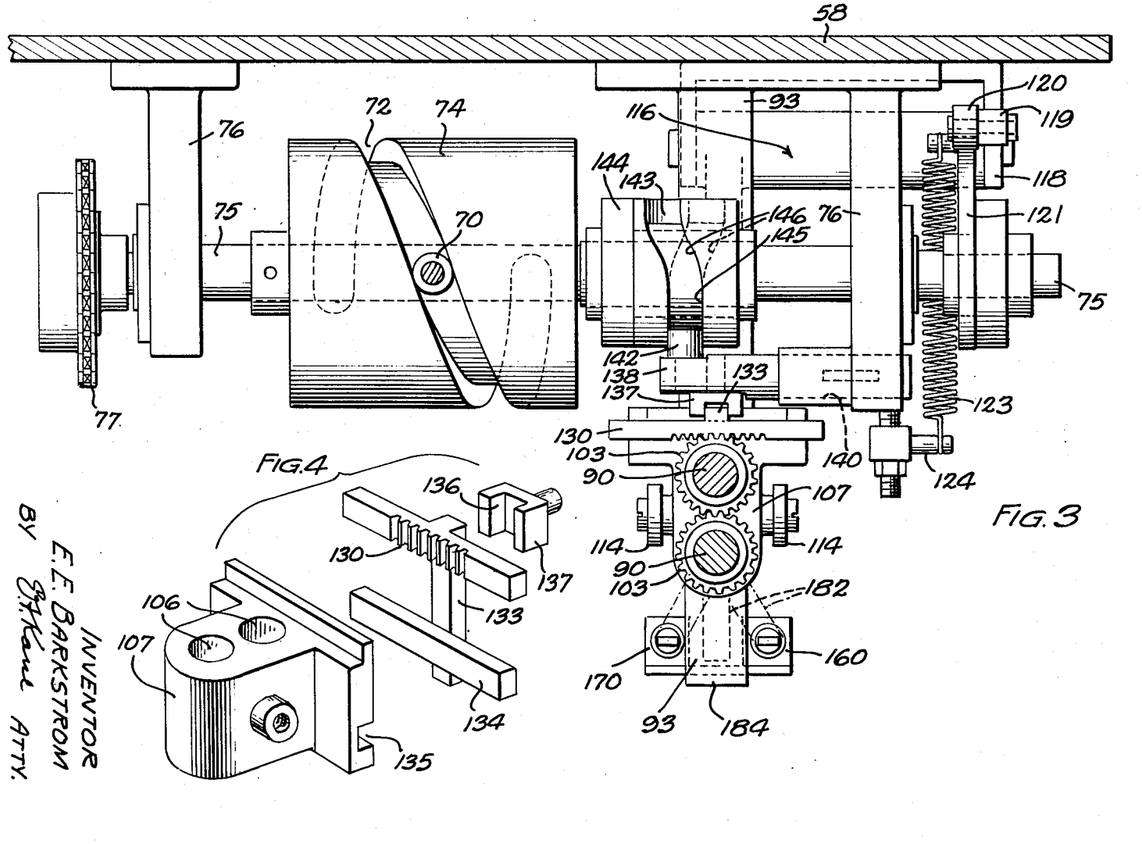
Fig. 3 is a plan sectional view of a portion of the machine taken substantially along the line 3—3 of Fig. 1 and showing the parts in an intermediate position.
Fig. 4 is a detailed view in perspective of several parts in separated relation to each other.

The vertical shafts 90 have gears 103—103 (Fig. 2) fixed thereon in meshing relation with each other for imparting equal and opposite oscillatory movement to the shafts, the brackets 86, and the cutters 30 carried thereby. Abutting the gears 103 is a pair of shouldered bushings 105—105 which fit into one end of a pair of apertures 106—106 in a connector member or block 107 (Fig. 4), and a pair of shouldered bushings 108—108 fitting in the opposite ends of the aperture 106 is retained therein by a pair of lock nuts 109—109 threaded on the shaft 90. The connector block 107 is thus locked between the shouldered bushings 105 and 108 by the gears 103 and the nuts 109 secured to the shafts 90, and in turn the connector block 107 serves to prevent vertical or axial displacement of the shafts 90 relative to each other.

Means are provided for raising and lowering the shafts 90 and the brackets 86 to align the cutters 30 horizontally with successive portions of the fins 20 to be engaged by the cutters as the article 20 is moved between them. In the embodiment illustrated herein, the connector member 107 is pivotally connected to the upper ends of a pair of links 114—114 (Figs. 1, 2 and 3), which at their lower ends are connected to the end of one arm 115 of a bell crank member 116. The bell crank 116 is pivotally supported on a pin 117, which is supported in a bracket 118 fixed to the frame plate 58. The other arm 119 of the bell crank extends upwardly and carries a cam roller 120 which rides in engagement with a cam surface of a peripheral cam 121 secured to the cam shaft 75. The cam 121 is shaped so as to impart movement through the bell crank and associated linkage to the cutters 30 to raise and lower the cutters 30 in timed relation with the movement of the carriage 28 to maintain the cutters 30 in horizontal alignment with successive portions of the line of flash 22 on the article as it is advanced. A coil spring 123 secured at one end to the arm 119 of the bell crank 116, and at its other end to a rod 124 mounted on the frame plate 58, stresses the bell crank in one direction and serves to aid in maintaining the cam follower 120 in engagement with the cam 121.

It is desirable that the grooves be substantially of uniform width and depth, and in order to cut such grooves it is essential that the cutters 30 be disposed substantially at right angles to the portion of the surface engaged by the cutters. This is accomplished in the present apparatus by a cam actuated mechanism for turning the cutters 30—30 and the carriers supporting them through a predetermined angular movement in a predetermined sequence in timed relation to the movement of the carrier 28, while permitting vertical and horizontal movement of the cutters 30 transversely of the path of movement of the carriage. The mechanism comprises a rack bar 130 (Figs. 2, 3 and 4) meshing with one of the gears 103 and mounted for sliding movement on the upper surface of a rail formed on the connector block 107. Extending outwardly and downwardly from the rack bar 130 is a tongue or bar 133 which is connected to a slide bar 134 formed thereon in parallel relation to the rack 130 and adapted to slidably engage in a groove 135 in the connector block 107. The tongue 133 of the rack bar slidably engages in a slot 136 of a slide block or member 137 carried by a push bar 138 mounted for reciprocatory movement in a guide aperture 140 in the bracket 76. The push bar 138 is provided with a cam roller 142 which rides in a cam groove 143 of a barrel cam 144 mounted on the cam shaft 75. The cam groove 143 is formed with an intermediate dwell portion 145 and sloping portions 146 which impart movement through the cam roller 142, and associated mechanism to the shafts 90 and the brackets 86 to oscillate the cutters 30 where the flash 22, as viewed from above, curves outwardly from the straight intermediate portion of the telephone handset handle at both ends thereof to position the cutters substantially perpendicular to the surface of the portion of the article being cut.

The reversible motor 80 which is driven in opposite directions to oscillate the cam shaft 75 and the cams 74, 121 and 144 thereon through approximately 330° as previously mentioned, is connected to a power line 145 (Fig. 8) through two sets of normally open contacts 146 and 147. The sets of contacts 146 and 147 are alternately closed under control of actuating solenoids 148 and 149, which are selectively energized to determine the direction of rotation of the motor. One end of each of the control coils of solenoids 148 and 149 is connected to one end of a secondary 150 of a transformer, the primary 149 of which is connected to the power line 145, and the other end of the coil 148 is connected to one of a pair of lower contacts 152—152 of a control switch 154. The other one of the pair of contacts 152 is connected to one of a pair of upper contacts 156—156 of a control switch 158, and the other one of contacts 156 is connected through a microswitch 160 and a manually operated stop switch 162 to the other end of the secondary coil 150 of the transformer.

Figure 8:
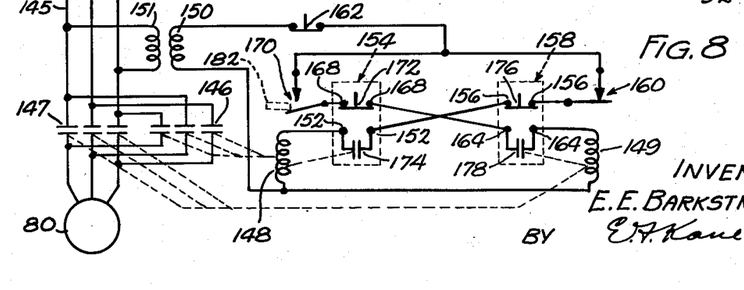
Fig. 8 is a diagram of the control circuit for the driving motor.

The other end of the coil 149 is connected to one of a pair of lower contacts 164 of the control switch 158, and the other contact 164 is connected to one of the pair of upper contacts 168 of the switch 154, the other of the contacts 168 being connected through a microswitch 170 and the stop switch 162 to the primary of the transformer 150. The control switch 154 is provided with a push button element 172 which is stressed to a normal upper position and has a bridging element for normally bridging the contacts 168, and is adapted to be manually depressed into engagement with the contacts 152 to bridge the contacts 152 and open the circuit across the contacts 168. A pair of normally opened contacts 174 are connected across the contacts 152 and are actuated to closed position by the solenoid coil 148 in response to the energization thereof, and forms a holding circuit across the contacts 152—152 after the circuit has been closed momentarily by the actuation of the push button element 176. The contact switch 158 is likewise provided with a push button element 176 normally stressed upwardly to bridge the contacts 156, and manually operable to disconnect the elements 156 and bridge the elements 164, and is also provided with a pair of normally opened contacts 178 connected across the contacts 164 and actuable to closed position by the solenoid coil 149 in response to the energization thereof to form a holding circuit across the contacts 164.

It will thus be seen, that in response to the actuation of the push button element 172 of the control switch 154, a circuit may be completed to cause the energization of the coil 148 and the closing of the contacts 146 to cause the motor to rotate in one direction and impart movement to the carriage 28 in one direction, and that the control circuit includes the microswitch 160 which may be actuated to open position to cause the opening of the contacts 146 to stop the operation of the motor 80 and the movement of the carriage. In like manner, in response to the actuation of the push button element 176 of the control switch 158, a circuit may be closed to energize the solenoid coil 149 to cause the closing of the contacts 147 and the rotation of the motor in the reverse direction to affect the reverse movement of the carriage 28, and that the control circuit includes the microswitch 170 which may be actuated to open position to cause the opening of the contacts 147 and to disconnect the motor 80 from the power line and stop the movement of the carriage 28. The microswitches 160 and 170 are adapted to be actuated alternately by a trip member 182 (Figs. 1, 2, 3 and 8) at the end of movement in opposite directions of the carriage 28. The trip member 182 which is mounted on the lower end of one of the shafts 90 (Figs. 1 and 3) is movable vertically and oscillatable angularly with the shaft, and is engageable alternately with the microswitches 160 and 170 mounted in the path of movement of the trip member 182 on a plate 184 fixed to the outer end of the bracket 93.

Figure 1:
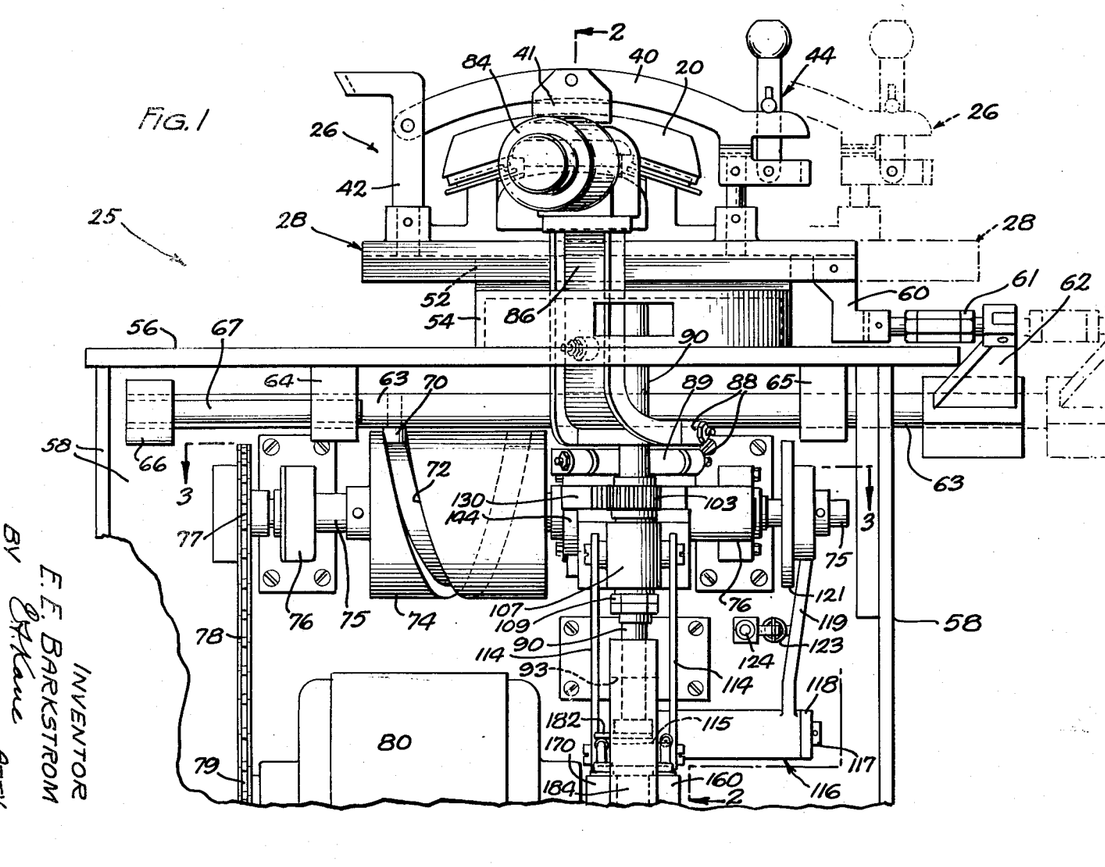
Figure 1 is a front elevational view of the machine showing the carriage with the article thereon in full lines at the end of its movement in one direction, and indicating in dotted lines the position of the carriage at the end of its movement in the opposite direction.

In the operation of the device, the carriage 28 initially may be in its left hand position as indicated in full lines in Fig. 1, or it may be in its righthand position as indicated in dotted lines in the same figure. At the end of each cycle of operation, the cutters 30 are positioned below one end of the flash fin 22 on the telephone handset handle 20 and provide clearance for the reception of an uncut or unfinished handle member 20 after the finished handle 20 has been removed from the holder. With an uncut handle 20 clamped in position in the holder 26 on the carriage, the push button element 172 of the control switch 154 may then be actuated to cause the motor 80 to rotate in one direction, and impart rotation in the same direction at the cam shaft 75 and the cams 74, 144 and 121 thereon. The cam 74 connected to the carriage 28 will impart movement thereto in a righthand direction at a uniform rate. The cam 121 through its associated linkage will impart vertical movement to the cutters 30 in timed relation with the movement of the carriage to align the cutters horizontally with successive portions of the line of the flash on the handle 20 being engaged by the cutters 30, and the cam 144 will cause the cutters to be oscillated through a predetermined angle and sequence in timed relation to the movement of the carriage 28 to maintain the cutters substantially perpendicular to the surface of the portion of the handle 20 engaged by the cutters. As the carriage 28 and the article 20 are advanced, the cam members 99 on the carriage 28 in cooperation with the cam followers 97 and the springs 96 connected to the pivoted carriers 86 serve to move the cutters 30 toward and away from each other in a horizontal direction to properly position the ends thereof in engagement with successive portions of the fins 22 of the handle 20. Thus, the cam members 144, 121 and 99 cooperate to impart movement in diverse directions to the cutters 30 in a predetermined sequence in timed relation to the movement therebetween of the article 30, resulting in the cutters following the successive portions of lines of flash on the handle and cutting grooves therein of substantially uniform width and depth. During a cycle of operation the trip member 182 (Fig. 2), which at the beginning of the cycle of operation is in engagement with the normally closed microswitch 170 and holds it in open position, is moved upwardly, the switch 170 oscillated angularly and then moved downwardly, and as the carriage 28 arrives at the end of its movement, the trip member 182 engages and actuates the normally closed microswitch 160 to its open position to disconnect the motor 60 and stop the operation of the apparatus. On completion of this cycle of operation, the carriage 28 will be disposed in its righthand position and the article 20 with the grooves cut therein along the flash lines, may then be removed from the holder and an unfinished or uncut article 20 may be loaded on the machine and clamped in position in the holder, and another cycle of operation may be initiated by actuating the push button element 176 of the control switch 158. The following cycle of operation is the same as the preceding one, except that it is performed with the parts moving in the opposite direction, and on its completion the carriage 28 is disposed in its lefthand position as indicated in full lines in Fig. 1, and the other one of the pair of microswitches 160 and 170 is actuated by the trip 182.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for grooving handset handles comprising a holder for supporting said handle, means for reciprocating said holder through a rectilinear path, a pair of rotatable cutters disposed on opposite sides of a handle in said holder, drive means for rotating said cutters, a pair of elements mounted below said holder for oscillation about vertical axes and for vertical movement, a pair of brackets pivotally connected to said members for oscillatable and vertical movements with said elements and for pivotal movement about horizontal axes to support said cutters for movement toward and away from each other, spring means stressing said brackets and said cutters toward each other, cam followers on said brackets, cams on said holder engageable with said followers for moving said cutters away from each other, means connecting said elements for simultaneous rotary movement in opposite directions, means for raising and lowering said elements in timed relation to the movement of said holder, and means for oscillating said elements through a predetermined angle in timed relation to the movement of said holder.

2. An apparatus for grooving handset handles comprising a holder for supporting said handle, means for reciprocating said holder through a rectilinear path, a pair of rotatable cutters disposed on opposite sides of a handle in said holder, drive means for rotating said cutters, a pair of elements mounted below said holder for oscillation about vertical axes and for vertical movement, a pair of brackets pivotally connected to said members for oscillatable and vertical movements with said elements and for pivotal movement about horizontal axes to support said cutters for movement toward and away from each other, spring means stressing said brackets and said cutters toward each other, cam followers on said brackets, cams on said holders engageable with said followers for moving said cutters away from each other, means connecting said elements for simultaneous rotary movement in opposite directions, means for raising and lowering said elements in timed relation to the movement of said holder, a reversible motor for driving the holder and raising and lowering means, and switch actuating means on one of said elements operable to prepare said motor to reverse.

3. An apparatus for grooving handset handles comprising a holder for supporting said handle, means for reciprocating said holder through a rectilinear path, a pair of rotatable cutters disposed on opposite sides of a handle in said holder, drive means for rotating said cutters, a pair of elements mounted below said holder for oscillation about vertical axes and for vertical movement, a pair of brackets pivotally connected to said members for oscillatable and vertical movements with said elements and for pivotal movement about horizontal axes to support said cutters for movement toward and away from each other, spring means stressing said brackets and said cutters toward each other, cam followers on said brackets, cams on said holders engageable with said followers for moving said cutters away from each other, means connecting said elements for simultaneous rotary movement in opposite directions, means for raising and lowering said elements in timed relation to the movement of said holder, a reversible motor for driving the holder and raising and lowering means, manually operable switches for supplying driving power to said motor in each direction, and switch actuating means on one of said elements to alternately render said manually operable switches effective.

4. A machine for removing the mold flash on molded articles and cutting grooves therein comprising, a holder for supporting said article, guide means for supporting said holder and guiding it and the article for movement through a straight path, a pair of rotatable cutters disposed on opposite sides of the path of movement of said article engageable with said article for removing the fins thereon and cutting grooves therein, a pair of supporting elements mounted for oscillation about vertical axes in substantial alignment with the ends of said cutters and for vertical movement along said axes, supporting means operatively connected to said supporting elements for supporting said cutters for vertical and oscillatory movement with said supporting elements and for radial movement relative thereto, means for moving said holder along said straight path, means stressing said supporting means for radial movement in one direction, cam means on said holder engageable with said supporting means for moving said supporting means radially in the opposite direction, means operable in timed relation to the movement of said holder for raising and lowering said supporting elements, and means operable in timed relation to the movement of said holder for ocillating said supporting elements about their axes through a predetermined arc and in a predetermined sequence to position said cutters substantially perpendicular to the surfaces of the portions of the article engaged by the cutters.

5. A machine for removing the mold fins on a molded article and cutting grooves therein comprising, a holder for supporting said article, guide means for supporting said holder and guiding it and the article for movement through a straight path, a pair of rotatable end milling cutters disposed on opposite sides of the path of movement of said article and engageable with the article to remove the fins therefrom and cut grooves therein, means for rotating said cutters, a pair of elements mounted for oscillation about vertical axes and in substantial alignment with the ends of said cutters and for vertical movement along said axes, supporting arms movably connected to said elements for supporting said cutters for movement transversely of the movement of said article and in planes passing through the axes of said elements, spring means urging said arms for movement in one direction, cam means on said holder for moving said arms in the opposite direction, a first cam means operatively connected to said holder for advancing said holder a predetermined distance in said straight path, a second cam means operatively connected to said elements for raising and lowering said elements and the cutters connected therewith, a third cam means operatively connected to said elements for oscillating said cutters in opposite directions through a predetermined angular movement in timed relation with the movement of said holder, and drive means for actuating said cam.

6. A machine for removing the mold flash on molded articles and cutting grooves therein comprising, a holder for holding a molded article therein, frame means for supporting and guiding said holder for movement in a straight path, a pair of end milling cutters disposed on opposite sides of a path of movement of said article and engageable with said article for cutting away the mold flash thereon and forming grooves therein, means for moving said holder and said article therein a predetermined distance along said straight path, a pair of supporting elements mounted in said frame means below said holders for oscillatable movement about vertical axes in substantial alignment with the ends of said cutters and for vertical movement, an arm on each of said supporting elements pivotally mounted thereon for supporting said cutters for vertical and oscillatable movement with said elements and for rocking movement toward and away from each other and in planes through the axes of said elements, cams on said holder operable to move said cutters away from each other, means urging said cutters for movement toward each other, means for raising and lowering said supporting elements in timed relation to the movement of said holder, and means for oscillating said elements in opposite directions through a predetermined angle in timed relation to the movement of said holder.

7. A machine for removing a mold flash on molded articles and cutting a groove therein comprising, a holder for holding said molded article, frame means for supporting and guiding said holder for movement through a straight path, an end milling cutter disposed adjacent the path of movement of said article and adapted to engage said article and cut a groove therein along the line of the mold flash, a supporting element mounted in said frame means below said cutter for oscillatable movement about a vertical axis in substantial alignment with the end of said cutter and for vertical movement along said axis, an arm pivotally connected to said supporting element for supporting said cutter for vertical and oscillatable movement with said element and for rocking movement toward and away from said article in planes passing through said axis, resilient means stressing said arm for movement in one direction to move the cutter toward said article, cam means on said holder for rocking said arm in the other direction, means for advancing said holder a predetermined distance through said straight path of movement alternately in opposite directions whereby articles may be moved in opposite directions and grooves cut therein during the movement thereof in said opposite directions, means for raising and lowering said supporting element in timed relation to the movement of said holder, and means for oscillating said supporting element through a predetermined angle in timed relation to the movement of said holder.

8. A machine for removing the mold flash on molded articles and cutting grooves therein comprising, a holder for supporting an article therein, frame means for supporting and guiding said holder for rectilinear movement, a pair of end milling cutters disposed on opposite sides of said holder and engageable with said article for cutting grooves therein, means for rotating said cutters, a pair of supporting elements mounted in said frame means for oscillatable movement about vertical axes in substantial alignment with the ends of said cutters and for vertical movement, a supporting arm on each of said supporting elements pivotally connected thereto for supporting said cutters for oscillatable and vertical movement with said elements and for pivotal movement toward and away from each other in planes passing through said axes, spring means urging said arms in one direction for moving said cutters toward the article, cam followers on said arms, cam members on said holders engageable with said cam followers operable in cooperation with said spring means to move said cutters toward and away from said article in timed relation to the movement of said holder, a cam shaft supported on said frame means, a first cam on said cam shaft, means operatively connecting said first cam with said holder and operable to reciprocate said holder in response to actuation of said cam, a second cam on said cam shaft, means operatively connected to said pair of supporting elements and cooperating with said second cam for raising and lowering said elements, a pair of gears on said elements in meshing relation to each other for imparting equal and reverse oscillation to said elements and the cutters connected therewith, a third cam on said cam shaft, means operatively connected to one of said shafts and actuated by said third cam for oscillating said elements, a motor operatively connected to said cam shaft for actuating said shaft, circuit control means including a pair of stop switches for controlling the operation of said motor, and trip means operable in timed relation with the reciprocation of said holder to actuate alternate ones of said switches at the end of movements in opposite directions of said holder.

9. A machine for removing a mold flash on molded articles and cutting grooves therein comprising, a carriage having a holder thereon for holding a molded article, frame means for guiding said carriage and the article thereon for movement through a straight path, a pair of end milling cutters disposed on opposite sides of the path of movement of said article and engageable with said article for cutting grooves therein, means for rotating said cutters, a pair of elements mounted in said frame means below said cutters for oscillation about vertical axes in substantial alignment with the ends of said cutters and for vertical movement along said axes, an arm on each of said elements pivotally connected thereto for supporting said cutters for rocking movement toward and away from each other in planes through said axes, spring means for rocking said arms in one direction, cams on said carriage for rocking said arms in the opposite direction, means connecting said elements for simultaneous oscillating movement in opposite directions, a first cam actuated means for reciprocating said carriage through said straight path, a second cam actuated means for vertically reciprocating said elements, a third cam actuated means for oscillating one of said elements in a predetermined sequence through a predetermined angle, and drive means for actuating said cam actuated means.

ELMER E. BARKSTROM.

REFERENCES CITED

The following references are of record in the file of this patent:

UNITED STATES PATENTS

| Number | Name | Date |
|---|---|---|
| 570,091 | Harrison | Oct. 27, 1896 |
| 1,378,865 | Hibbard | May 24, 1921 |
| 1,990,509 | Wiley | Feb. 12, 1935 |
| 2,151,078 | Bouvier et al. | Mar. 21, 1939 |